(12) United States Patent
Kuivallainen et al.

(10) Patent No.: US 8,912,873 B2
(45) Date of Patent: Dec. 16, 2014

(54) MAGNETIC SHIELDING APPARATUS

(75) Inventors: Jani Samuli Kuivallainen, Ulm (DE);
Thomas Benedict Slotte, Turku (FI);
Leo Kärkkäinen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 14/001,157

(22) PCT Filed: Feb. 23, 2011

(86) PCT No.: PCT/IB2011/050749
§ 371 (c)(1),
(2), (4) Date: Aug. 22, 2013

(87) PCT Pub. No.: WO2012/114149
PCT Pub. Date: Aug. 30, 2012

(65) Prior Publication Data
US 2013/0328648 A1    Dec. 12, 2013

(51) Int. Cl.
*H01F 7/00* (2006.01)
*H01F 7/02* (2006.01)
*H04R 1/02* (2006.01)
*H04B 1/38* (2006.01)
*H04M 1/03* (2006.01)

(52) U.S. Cl.
CPC ............ *H01F 7/02* (2013.01); *H04R 2209/022* (2013.01); *H04R 1/02* (2013.01); *H04M 1/03* (2013.01); *H04B 1/38* (2013.01)
USPC .......................................................... 335/301

(58) Field of Classification Search
CPC ........... H04M 1/03; H04R 1/02; H04R 1/023; H01F 7/02; H05K 9/0015
USPC ............. 335/219, 301; 361/679.01, 816, 818; 381/189, 190
See application file for complete search history.

(56) References Cited

U.S. PATENT DOCUMENTS

| 6,546,107 | B1 | 4/2003 | Boehnke | |
| 2005/0067216 | A1* | 3/2005 | Schuhmann et al. | 181/149 |
| 2010/0304796 | A1* | 12/2010 | Stohr et al. | 455/575.1 |
| 2014/0056448 | A1* | 2/2014 | Kuivalainen et al. | 381/189 |

FOREIGN PATENT DOCUMENTS

| WO | 2008061549 | 5/2008 | |
| WO | WO 2013005073 A1 * | 1/2013 | |

OTHER PUBLICATIONS

International Search Report received for corresponding Patent Cooperation Treaty Application No. PCT/IB2011/050749, dated Nov. 14, 2011, 4 pages.

* cited by examiner

*Primary Examiner* — Bernard Rojas
(74) *Attorney, Agent, or Firm* — Harrington & Smith

(57) ABSTRACT

An apparatus comprising: a transducer configured to generate a static magnetic field; at least one magnet plate configured with respect to the transducer to produce a magnetically shielded region from the static magnetic field; and at least one further plate located between the transducer and an exterior of the apparatus and within the magnetically shielded region wherein the at least one magnetic shielding plate is configured to form a trap for particles.

19 Claims, 4 Drawing Sheets

MAGNETIC SHIELDING APPARATUS

RELATED APPLICATION

This application was originally filed as PCT Application No. PCT/IB2011/050749 filed Feb. 23, 2011.

FIELD OF THE APPLICATION

The present application relates to a method and apparatus for magnetic shielding. In some embodiments the method and apparatus relate to a magnetic shielding for transducers.

BACKGROUND OF THE APPLICATION

Some portable electronic devices comprise transducers such as loudspeakers and/or earpieces which are required to be small in size. Transducers are important components in electronic devices such as mobile phones for the purposes of playing back music or having a telephone conversation. The quality and loudness of a transducer in an electronic device are important especially if a user listens to sounds generated by an electronic device at a distance from the electronic device.

Furthermore in portable devices dust and water protection is important specifically with regards to the transducers. However dust and other small particles (and water) can often reach the transducer components and cause component damage. In particular the dynamic moving coil components in transducers radiate in each direction as the diaphragm moves forwards and backwards and as the construction of the transducer typically has open outlets on either side of the transducer which are free to air and the permanent magnet of a moving coil transducer can attract magnetic particles which migrate through the portable device and reach the coil and diaphragm. These particles can damage the sensitive components and/or reduce the performance of these components when the apparatus is in operation.

For example after some time the force between magnetic dust on the diaphragm and the permanent magnet inside the electrodynamic loudspeaker can pull the diaphragm towards the magnet and make the sound quieter, cause distortion or both. These types of failure typically requires repair and are costly to the manufacturer of the device if the failure occurs within the warranty period. Furthermore these features can cause brand damage if the failure occurs soon after the warranty period as the user considers the device to have failed prematurely and of poor quality.

Often a protective mesh or other porous material, where appropriate, is implemented to assist audio reproduction quality but maintain good reliability of the transducer by protecting the transducer from particles entering through the sound outlets in the device. For example a dust net can be placed in front of the loudspeaker. However the more effective a dust net is, in other words the denser the material used, the more attenuation to the sound generated by the speaker and therefore the muffling of the speaker output occurs.

In some situations a complicated mechanical channel structure can be used to improve dust protection by making the route longer from the outer surface of the phone to the loudspeaker diaphragm. However longer channel structures require additional volume within the device and furthermore require the height or depth of the phone to be increased in order to employ the additional channel length. These increased dimensions are counter to the current design trend to make the phone as thin as possible in order to create a device which is as portable as possible.

It has also been proposed that a permanent magnet can be used to collect the magnetic dust. However the employment of further permanent magnets not only increases the cost and that the number of parts required for the device but furthermore can increase stray magnetic fields which are detrimental to the use of the device as they can accidentally erase other magnetic items such as the magnetic strip on a credit card, debit card, a train ticket, or other device using a magnetic strip.

The use of magnetic shields have also been proposed (such as using a perforated μ-metal plate that lets sound pass through). The magnetic shield can be placed in front of the loudspeaker and used to weaken the stray magnetic field and effectively alter the direction of the attractive force. However in doing this it removes the ability of the loudspeaker to operate in a hearing aid compatibility (HAC) mode as typically hearing aid compatibility requires the coupling of magnetic fields such as those generated by the transducer.

SUMMARY OF SOME EMBODIMENTS

In a first aspect of the application there is provided an apparatus comprising: a transducer configured to generate a static magnetic field; at least one magnet plate configured with respect to the transducer to produce a magnetically shielded region from the static magnetic field; and at least one further plate located between the transducer and an exterior of the apparatus and within the magnetically shielded region wherein the at least one magnetic shielding plate is configured to form a trap for particles.

The at least one magnetic plate may be located between the transducer and an apparatus cover of the apparatus with at least one conduit configured to permit sound to pass through the at least one magnet plate.

The apparatus may further comprise a dust net located proximate to the at least one conduit configured to permit sound to pass through the dust net.

The apparatus may further comprise a cover comprising at least one cover conduit configured to permit sound to pass through the cover.

The at least one cover conduit and at least one magnetic plate conduit may be skewed with respect to the relative direction to the transducer.

The at least one further plate may comprise at least one of: a mu-metal plate; a material with high magnetic permeability; stainless steel grade SUS 310; and stainless steel grade SUS 430.

The at least one magnet plate may be in contact with the at least one further plate.

The at least one magnet plate may comprise at least one of: a neodymium magnet plate; a rare earth magnet plate; and a permanent magnet plate.

The at least one further plate may comprise at least one air gap configured to form the trap for particles.

The air gap may be at least partially co-incident with at least one of the at least one cover conduits configured to permit sound to pass through the cover.

The at least one air gap may be coated by a material whose relative permeability is lower than the further plate.

According to a second aspect of the application there is provided a method comprising: locating at least one magnet plate between a transducer and an exterior of an apparatus configured to produce a magnetically shielded region from the static magnetic field from the transducer; locating at least one further plate within the magnetically shielded region; and forming a trap for particles in the at least one magnetic shielding plate.

The method may further comprise providing at least one conduit configured to permit sound to pass through the at least one magnet plate.

The method may further comprise locating a dust net proximate to the at least one conduit configured to permit sound to pass through the dust net.

The method may further comprise providing a cover; and providing at least one cover conduit within the cover configured to permit sound to pass through the cover.

Providing the at least one cover conduit may comprise providing the at least one cover conduit skewed with the at least one magnetic plate conduit and with respect to the relative direction to the transducer.

The at least one further plate may comprise at least one of: a mu-metal plate; a material with high magnetic permeability; stainless steel grade SUS 310; and stainless steel grade SUS 430.

Locating at least one magnet plate may comprise locating the at least one magnet plate in contact with the at least one further plate.

The at least one magnet plate may comprise at least one of: a neodymium magnet plate; a rare earth magnet plate; and a permanent magnet plate.

Locating the at least one further plate may comprise providing at least one air gap in or between the at least one further plate configured to form the trap for particles.

Providing at least one air gap in or between the at least one further plate may comprise providing the at least one air gap is at least partially co-incident with at least one of the at least one cover conduits configured to permit sound to pass through the cover.

The method may further comprise coating the at least one air gap by a material whose relative permeability is lower than the further plate.

According to a third aspect of the application there is provided an apparatus comprising: transducer means for generating a static magnetic field; means for producing a magnetically shielded region from the static magnetic field; and particle trapping means located between the transducer means and an exterior of the apparatus and within the magnetically shielded region wherein the particle trapping means forms a trap for particles.

The means for producing a magnetically shielded region may be located between the transducer means and mechanical protective means of the apparatus, the mechanical protective means with at least one conduit means for permitting sound to pass through the means for producing a magnetically shielded region.

The apparatus may further comprise a dust net located proximate to the at least one conduit means configured to permit sound to pass through the dust net.

The apparatus may further comprise a mechanical protective means comprising at least one conduit configured to permit sound to pass through the mechanical protective means.

The at least one conduit and at least one conduit means may be skewed with respect to the relative direction to the transducer means.

The particle trapping means may comprise at least one of: a mu-metal plate; a material with high magnetic permeability; stainless steel grade SUS 310; and stainless steel grade SUS 430.

The means for producing a magnetically shielded region may be in contact with the particle trapping means.

The means for producing a magnetically shielded region may comprise at least one of: a neodymium magnet plate; a rare earth magnet plate; and a permanent magnet plate.

The particle trapping means may comprise at least one air gap configured to form the trap for particles.

The air gap may be at least partially co-incident with at least one of the at least one conduits configured to permit sound to pass through the mechanical protective means.

The at least one air gap may be coated by a material whose relative permeability is lower than the further plate.

An electronic device may comprise an apparatus as described above.

Embodiments of the present invention aim to address one or more of the above problems.

BRIEF DESCRIPTION OF DRAWINGS

For a better understanding of the present application and as to how the same may be carried into effect, reference will now be made by way of example to the accompanying drawings in which.

SOME EMBODIMENTS OF THE APPLICATION

The following describes apparatus and methods for magnetically shielding a transducer.

Figure 1:
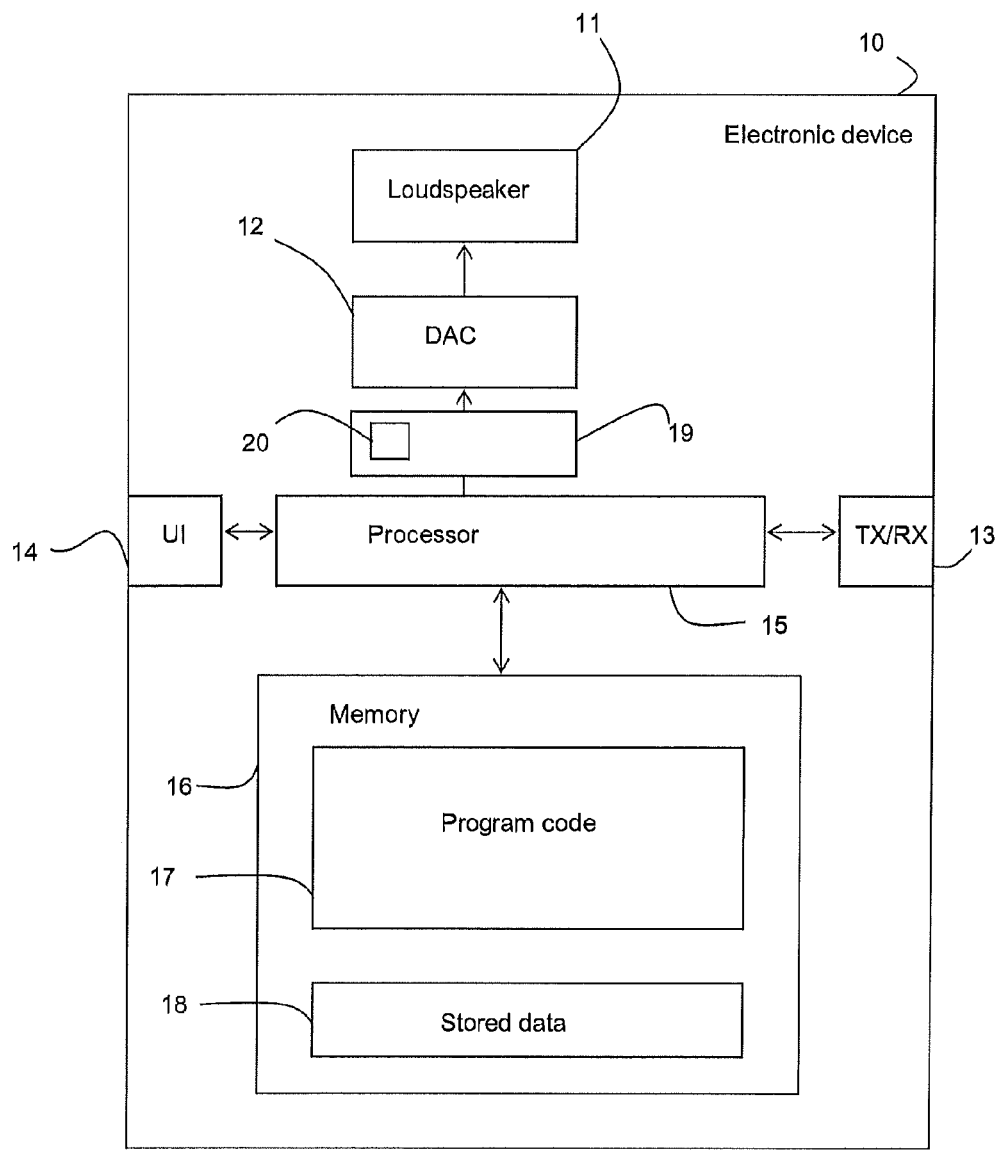
FIG. 1 illustrates a schematic block diagram of an apparatus according to some embodiments.

FIG. 1 discloses a schematic representation of an electronic device or apparatus 10 comprising a transducer or speaker 11. The transducer 11 may be an integrated speaker such as an integrated hands free speaker, (IHF), loudspeaker or an earpiece.

The transducer 11 in some embodiments can be any suitable speaker type comprising a permanent magnet. Additionally or alternatively the transducer 33 comprises a multifunction device (MFD) component having any of the following; combined earpiece, integrated handsfree speaker, vibration generation means or a combination thereof.

The apparatus 10 in some embodiments can be a mobile phone, portable audio device, or other means for playing sound. The apparatus 10 has a sound outlet for permitting sound waves to pass from the transducer 11 to the exterior environment.

The apparatus 10 is in some embodiments a mobile terminal, mobile phone or user equipment for operation in a wireless communication system.

In other embodiments, the apparatus 10 is any suitable electronic device configured to generate sound, such as for example a digital camera, a portable audio player (mp3 player), a portable video player (mp4 player) and a portable computer, for example a laptop PC. In some other embodiments the apparatus 10 can be any suitable audio or audio subsystem component or any suitable audio capture/audio rendering device In some embodiments, the apparatus 10 comprises a sound generating module 19 which is linked to a processor 15. The processor 15 can be configured to execute various program codes. The implemented program codes may comprise a code for controlling the transducer 11 to generate sound waves. In some embodiments the sound generating module 19 comprises a transducer protection module 20 for modifying the audio signals for the transducer 11.

The implemented program codes in some embodiments 17 can be stored for example in the memory 16 for retrieval by the processor 15 whenever needed. The memory 16 could further provide a section 18 for storing data, for example data that has been processed in accordance with the embodiments.

The code can, in some embodiments, be implemented at least partially in hardware or firmware.

In some embodiments the processor 15 is linked via a digital-to-analogue converter (DAC) 12 to the transducer 11. The digital to analogue converter (DAC) 12 can be any suitable converter.

In some embodiments the DAC 12 sends an electronic audio signal output to the transducer 11 and on receiving the audio signal from the DAC 12, the transducer 11 generates acoustic waves. In other embodiments, the apparatus 10 receives control signals for controlling the transducer 11 from another electronic device.

The processor 15 can be further linked to a transceiver (TX/RX) 13, to a user interface (UI) 14 and to a display (not shown). The user interface 14 can enable a user to input commands or data to the apparatus 10. Any suitable input technology can be employed by the apparatus 10. It would be understood for example the apparatus in some embodiments could employ at least one of a keypad, keyboard, mouse, trackball, touch screen, joystick and wireless controller to provide inputs to the apparatus 10.

Figure 2:
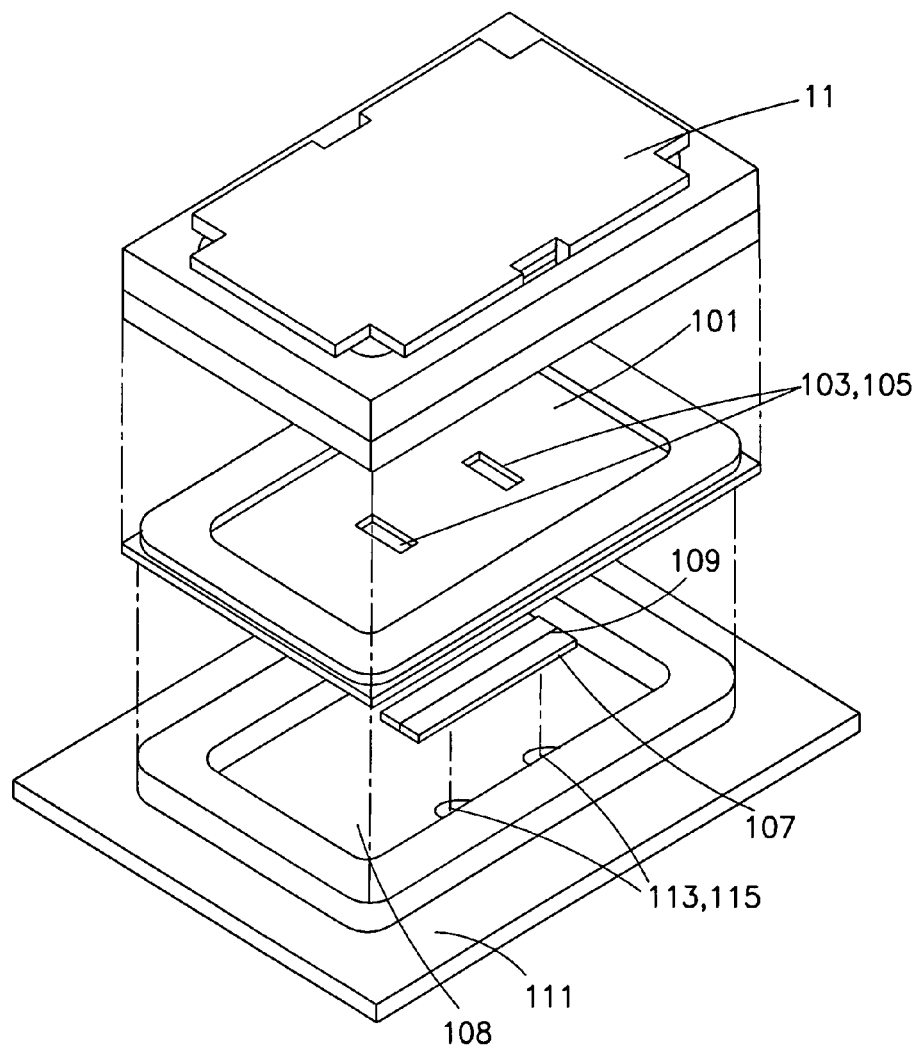
FIG. 2 illustrates a schematic diagram of a magnetic shield configuration according to some embodiments of the application.

FIG. 2 illustrates a schematic diagram of a magnetic shield configuration for a speaker or transducer according to some embodiments of the application. The configuration shows a particular example of the general concept of the application wherein the physical construction of the apparatus comprises a transducer for the speaker 11 and cover 111 region of the apparatus 10 separated by a thin permanent magnet 101 or magnet plate with a low magnetic permeability to counter the static magnetic field of the speaker 11 and a dust trap layer, for example at least one plate or small plates made of μ-metal attached on the thin magnet 101 where the μ-metal plates contain a narrow gap which is shaped to contain or collect metal dust by means of concentrating the magnetic field to certain regions on the magnet 101. These concentrated magnetic field regions can be referred to as being the "dust trap" region.

Although the examples shown herein discuss the application of embodiments where the transducer is a speaker (in other words converting electrical or electronic signals into acoustic waves), it would be understood that in some embodiments the transducer is a microphone converting acoustic waves into electrical or electronic signals.

Furthermore although FIG. 2 is shown such that the speaker is located above the cover it would be understood that the terms "above" and "below" are simply reference directions and do not limit embodiments of the application to any particular alignment or directional orientation. The arrangement of the following components is shown as a stack of layers which are separated by a series of spacer or gasket layers. These layers forming the stack of layers can be summarised as: the cover located at the bottom; and above the cover 111 are located a μ-metal 107 layer, magnet 101 layer, and speaker 11 layer.

In some embodiments the apparatus 10 can comprise a cover. A part of the cover is shown in FIG. 2 by the cover region 111 or mechanical protective means. The cover region 111 shows part of a cover or case of the apparatus which can be used to mechanically protect the electronic components within the device or apparatus. In some embodiments the cover region 111 can comprise within the cover a series of sound outlet holes. The sound outlet holes can be conduits or acoustic windows and permit acoustic or sound waves to pass between the environment or exterior of the apparatus and the interior of the apparatus.

In FIG. 2 two cover sound outlet holes are shown: These two cover sound outlet holes are a first sound outlet hole 113 and a second sound outlet hole 115. The cover sound outlet holes 113, 115 shown in FIG. 2 are a pair of round or circular outlet holes however it would be understood that in some embodiments any suitable number, shape and arrangement of holes can be used to allow sound waves to pass through the cover region 111. Thus in some embodiments the cover sound outlet holes can be a single hole, or at least one slit. In some embodiments the cover sound outlet holes 113, 115 can be covered by an acoustic transparent or opaque cover, such as a wire mesh or dust net, to attempt to reduce foreign bodies entering the device. The cover region 111 in some embodiments can be an integral part of the complete casing of the device or apparatus, or in some other embodiments a section of cover or casing. Furthermore the inside of the cover region 111 can be formed in such a manner to enable other parts or elements of the apparatus such as shown in FIG. 2 to cooperate and locate these other elements or components relative to the sound outlet hole or other elements within the apparatus. For example as shown in FIG. 2 a moulding locates and offsets the magnet and speaker layers creating an acoustic chamber.

The apparatus 10 in some embodiments further comprises means for generating a dust trap or particle trapping means. In some embodiments the dust trap means as shown in the example in FIG. 2 comprises two separate μ-metal plates 107a, 107b which furthermore can be located within the cover and specifically within a cover pocket region 108. The pair of μ-metal plates can be arranged such that they lie adjacent to each other separated by a small air gap. The air gap can be formed in the pocket region 108 by suitable moulding forms locating the metal plates 107a, 107b or by a further form locating the two metal plates in such a way to form the air gap. In such embodiments the dust trap or magnetic trap 109 can therefore be formed by the two separate μ-metal (or other electromagnetically similar) plates which are located as close to each other as possible without touching. This neighbouring pair of μ-metal plates forms a narrow gap where the magnetic field is strong. Although the dust trap is shown being formed by the air gap between two separate μ-metal plates, it would be understood that a single plate with an air gap manufactured within it could also be used in some embodiments.

Although the following examples describe the use of μ-metal to generate the concentrated magnetic field region, it would be understood that any other material with similar electromagnetic properties could be used as a substitute material. For example in some embodiments the material used can be any suitable material with high permeability (in other words low magnetic resistance). Examples of such other materials are stainless steel SUS 310 and SUS 430. The μ-metal can, as described herein, have in some embodiments openings shaped both for dust (metal) collection but also for the transmission of sound through the layer, in other words a sound inlet or sound outlet.

The concentrated magnetic field areas can be generated using the principle that the magnetic flux density is locally higher in a region where there is a narrow gap and/or a sharp edge/corner in the plate or between plates. Furthermore in some embodiments by locating these regions such that they do not interfere with sound output through the plate or localised to the plate the "dust trap" has only a small effect on the acoustic properties of the speaker chamber. Therefore in such embodiments, dust entering from the outside is attracted to the dust trap rather than to the loudspeaker.

Although the example shown in FIG. 2 and described herein shows one dust trap or magnetic trap 101, it would be understood that in some embodiments more than one magnetic trap can be implemented. For example a further pair of μ-metal plates can be located also on and below the magnet 101 layer. Furthermore in some embodiments the μ-metal plates or plate with associated air gap to form the dust trap and sound outlet holes to permit acoustic wave transmission forms a complete layer below the magnet layer and above the cover. Furthermore although the air gap forming the dust trap/magnetic trap is shown as being linear it would be appreciated that in some embodiments the air gap structure can be any suitable configuration such as a linear array, or a rectangle or an oval or a circle. Furthermore the air gap may follow the outline of the cover sound outlet holes inside the cover speaker.

In some embodiments at least one of the metal plates can comprise a μ-metal plate sound outlet hole or at least one sound outlet hole or conduit means through which the transmission of acoustic or sound waves can pass relatively unhindered. In some embodiments the μ-metal plate sound outlet holes are located significantly distant from the air gap to ensure that the audio performance of the apparatus is consistent even if the dust trap 109 gets completely blocked by metal dust. Thus for example the sound outlet holes for the metal plates can be located at a position closer to the middle of the loudspeaker's magnet. Although in these examples the sound outlet holes are described as being holes, it would be understood that any suitable configuration or number of shapes can be implemented provided they provide a suitable acoustic medium.

In some embodiments the pair of μ-metal plates 107 are located substantially above the cover sound outlet holes 113, 115 so to directly attract metallic and other particles entering via the cover sound outlet holes.

Furthermore the apparatus can comprise means for producing a magnetically shielded region for example a magnet 101 or at least one magnet plate or layer as part of the stack structure. The magnet 101 layer can be spaced from the cover for example by a molding in the cover or a separate gasket. Furthermore the magnet 101 layer can be configured to form part of an acoustic chamber between the cover layer and the magnet 101 layer. In some embodiments the magnet 101 can be a very thin but strong permanent magnet with a low magnetic permeability. In some embodiments the magnet 101 can be a neodymium NdFeB magnet also known as NiB or Neo magnet. In some other embodiments the magnet 101 can be any other suitable NdFeB, rare earth magnet. The location of the neodymium magnet can be used to counter the static magnetic field of the transducer or speaker. For this reason the neodymium magnet is typically in embodiments configured to be magnetised in the opposite direction compared to the transducer or speaker 11 magnet. In some embodiments the magnet 101 can comprise sound outlet holes 103, 105 which permit the transmission of acoustic waves through the magnet 101 layer. The magnet sound outlet holes shown in FIG. 2 show a first slot 103 and a second slot 105. The magnet layer sound outlet or magnetic layer acoustic window can be any suitable shape, number, and arrangement and can in some embodiments be chosen to further tune the frequency response of the speaker assembly stack. In some embodiments the magnet 101 sound outlet holes are configured to be located approximately centrally with respect to the speaker such that the static magnetic field generated by the fixed or state component of the speaker transducer is further minimised. Furthermore as the magnetic field around the sound outlet holes 103 and 105 can be kept weak the magnetic layer sound outlet holes can be kept relatively clear of foreign material such as metallic particles. In some embodiments the magnet 101 layer sound outlet holes 103, 105 can be coated for example by a thin layer of tape or any material whose relative permeability is very low to further reduce the possibility of dust being attracted due to the air flowing to and from the transducer 11.

Furthermore the apparatus can comprise a transducer or speaker 11 layer mounted above the magnet layer 101. The speaker or transducer 11 can be any suitable transducer such a moving coil, moving magnet, or any transducer or speaker generating a magnetic field. For example in a moving coil transducer 11 there is typically a static magnetic field generated by a permanent magnet mounted and generating a magnetic field. The static magnetic field is changed in response to a dynamic transducer element when a current is passed through a coil. The static magnetic field is substantially shielded by the neodymium magnet or magnet 101 layer. The reduction of/blocking of the static magnetic field reduces the possibility of magnetic material passing to the speaker as the magnet trap formed from the μ-metal strips is more attractive for to dust particles.

Figure 3:
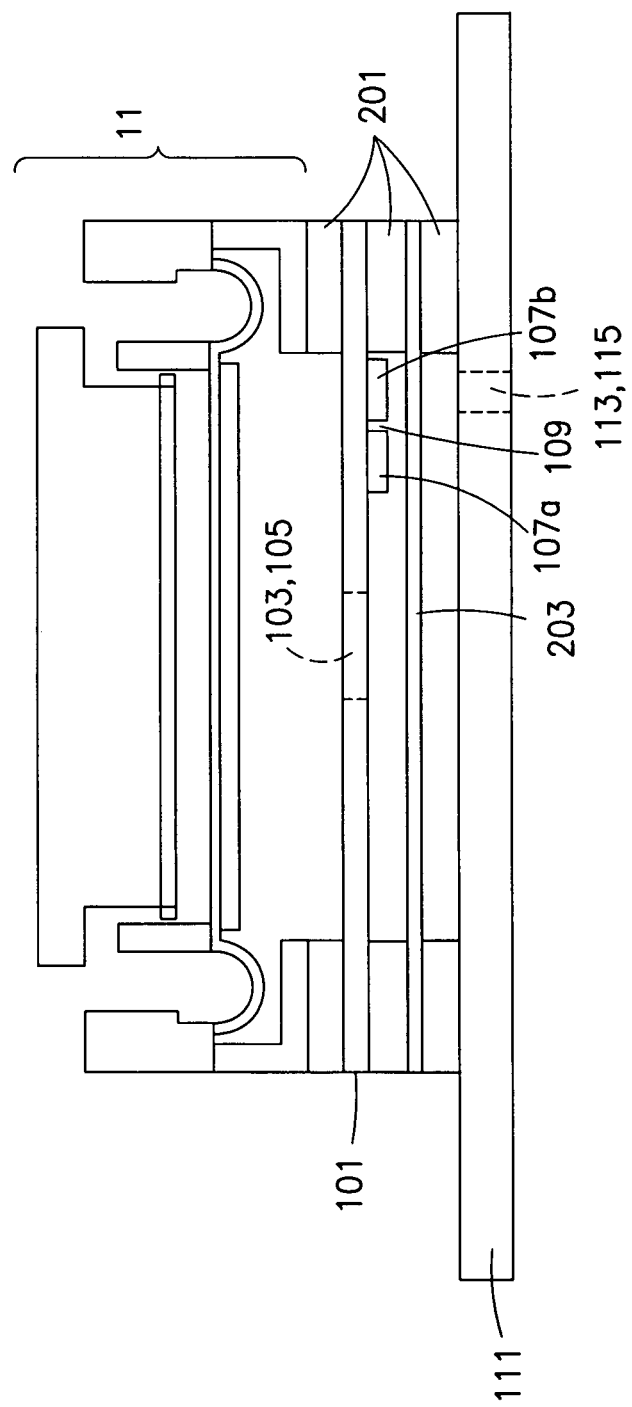
FIG. 3 illustrates a further schematic diagram of the magnetic shield configuration according to some embodiments of the application.

With respect to FIG. 3 a further view of the apparatus shown in FIG. 2 is shown, in this respect the apparatus is shown as a sectioned elevation. In this example the magnet 101 layer is located with respect to the cover 111 layer and by the use of a gasket or multiple gaskets which separate the layers. Furthermore as shown in FIG. 3, in some embodiments the apparatus and in particular the speaker or transducer stack can comprise between the cover and the magnet layers a dust net 203 layer. The dust net layer 203 in some embodiments can be configured to attempt to remove or trap some of the dust which enters through the cover sound outlet holes 113, 115 before reaching the magnetic trap 109 or the magnet 107 layer. In some embodiments the dust net is configured to be located between the cover 111 layer and the magnet 101 layer. Furthermore as shown in FIG. 3, the μ-metal strips on the surface of the magnet layer above or opposite the sound outlet holes of the cover to more easily attract the magnetic particles to the dust or magnetic trap 109.

Furthermore as shown in FIG. 3, the speaker and magnetic layer 101 can further be separated by a further gasket layer 201. in some embodiments the gasket layers or spacing elements between layers are implemented such that the speaker comprises a first gasket layer which locates a further layer such as the magnet layer, the magnet layer comprises its own gasket layer which in turn locates a further layer such as the dust net and the cover has an additional gasket layer which locates the dust net and other layers with respect to the cover layer.

Figure 4:
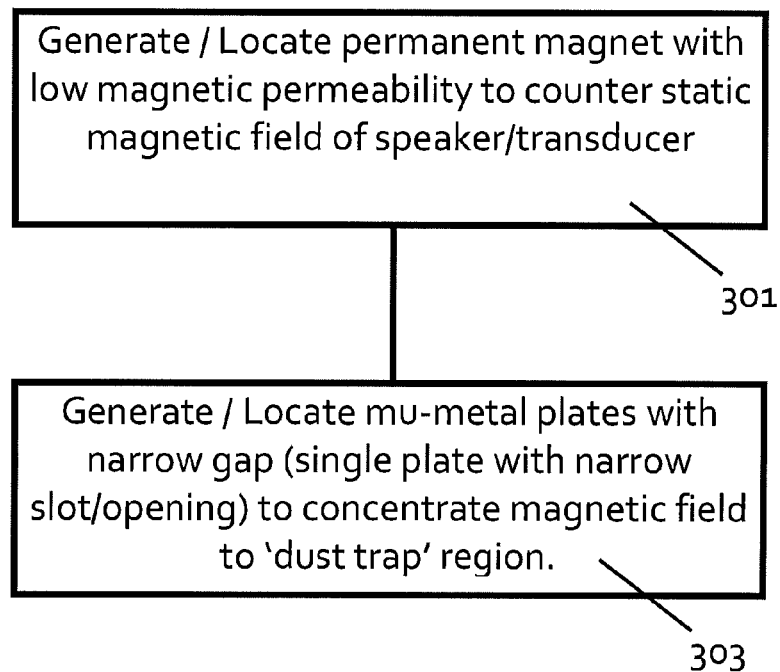
FIG. 4 illustrates a flow diagram of the method performed by the apparatus according to some embodiments.

With respect to FIG. 4, a flow chart of the operation for generating the magnetic shield according to embodiments of the application is shown.

In some embodiments the first operation is to design and/or manufacture the permanent magnet with a low magnetic permeability to counter the static magnetic field of the speaker/transducer. In some embodiments such as shown in FIGS. 2 and 3, the magnet 101 layer is formed or located between the speaker 11 and the cover region 111 and can be formed from a single layer of permanent magnet material. However in some other embodiments the magnet layer can be formed from multiple magnets, the gaps between magnets forming the magnet sound outlet hole regions 103, 105. The operation of generating or locating the permanent magnet to counter the static magnetic field of the speaker is shown in FIG. 4 by step 301.

In some embodiments the further operation is to then design and/or manufacture the μ-metal plates with a narrow gap. In some embodiments the gap can be formed by the close proximity of separate plates or the gap can be formed from cutting or pressing material from a single plate to form a suitable air gap. The location of the air gaps can furthermore be configured to be placed in an area of relatively high magnetic field strengths to form a magnetically attractive gap for the dust and other particles.

It would be appreciated that in some embodiments, for example as shown in FIG. 4, the two operational steps with respect to the manufacturing operations can be carried out concurrently, where for example the same process for forming the air gaps for the magnetic/dust trap and forming the permanent magnet layer are the same process.

In some embodiments there may be a combination of one or more of the previously described embodiments.

It shall be appreciated that the term portable device is user equipment. The user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

For example, in some embodiments the method of manufacturing the apparatus may be implemented with processor executing a computer program.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
  (a) hardware-only circuit implementations (such as implementations in only analog and/or digital circuitry) and
  (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
  (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed in there is a further embodiment comprising a combination of one or more of any of the other embodiments previously discussed.

The invention claimed is:

1. An apparatus comprising:
  a transducer configured to generate a magnetic field;
  at least one magnetic plate configured to produce a magnetically shielded region from the magnetic field with respect to the transducer; and
  at least one further plate located between the transducer and an exterior of the apparatus wherein the at least one further plate is within the magnetically shielded region and configured to form a trap for particles, wherein the at least one further plate contains at least one air gap configured to form the trap for particles, said air gap being formed either:

within a single one of said at least one further plate when said at least one further plate comprises one or more further said plates; or between two of said at least one further plate when said at least one further plate comprises at least two further said plates.

2. The apparatus as claimed in claim 1, wherein the at least one magnetic plate is located between the transducer and an apparatus cover of the apparatus with at least one magnetic plate conduit configured to permit sound to pass through the at least one magnetic plate.

3. The apparatus as claimed in claim 2, further comprising a dust net located proximate to the at least one magnetic plate conduit configured to permit sound to pass through the dust net.

4. The apparatus as claimed in claim 3, wherein said cover includes at least one cover conduit configured to permit sound to pass through the cover.

5. The apparatus as claimed in claim 4, wherein the at least one cover conduit and the at least one magnetic plate conduit are skewed with respect to the transducer position.

6. The apparatus as claimed in claim 1, wherein the at least one further plate comprises at least one of:
a mu-metal plate;
a material with high magnetic permeability;
stainless steel grade SUS 310; and
stainless steel grade SUS 430.

7. The apparatus as claimed in claim 1, wherein the at least one magnetic plate is in contact with the at least one further plate.

8. The apparatus as claimed in claim 1, wherein the at least one magnetic plate comprises at least one of:
a neodymium magnet plate;
a rare earth magnet plate; and
a permanent magnet plate.

9. The apparatus as claimed in claim 1, wherein the at least one further plate comprises at least two further plates which are separated by the at least one air gap.

10. The apparatus as claimed in claim 1, wherein the at least one air gap is at least partially co-incident with the at least one cover conduit.

11. The apparatus as claimed in claim 1 wherein the at least one air gap is formed so as to generate a concentrated magnetic field region.

12. The apparatus as claimed in claim 1, wherein the at least one magnetic plate is coated by a material whose relative permeability is lower than the at least one further plate.

13. The apparatus as claimed in claim 1, wherein the at least one magnetic plate comprises a material with a lower magnetic permeability with respect to the at least one further plate.

14. A method comprising:
locating at least one magnetic plate between a transducer and an exterior of an apparatus configured to produce a magnetically shielded region from the magnetic field of the transducer;
locating at least one further plate within the magnetically shielded region; and
forming a trap for particles in the at least one further plate.

15. The method as claimed in claim 14, further comprising providing at least one magnetic plate conduit configured to permit sound to pass through the at least one magnetic plate.

16. The method as claimed in claim 15, further comprising providing a cover; and providing at least one cover conduit within the cover configured to permit sound to pass through the cover.

17. The method as claimed in claim 16, wherein providing the at least one cover conduit comprises providing the at least one cover conduit skewed with the at least one magnetic plate conduit with respect to the transducer position.

18. The method as claimed in claim 14, wherein locating the at least one magnetic plate comprises locating the at least one magnetic plate in contact with the at least one further plate.

19. The method as claimed in claim 14, wherein locating the at least one further plate comprises forming at least one air gap within one of said at least one further plate, or between two of said at least one further plate.

* * * * *